United States Patent
Ciocca et al.

[11] Patent Number: 5,914,164
[45] Date of Patent: Jun. 22, 1999

[54] MULTILAYER OXYGEN-BARRIER PACKAGING FILM

[75] Inventors: Paolo Ciocca, Lumellogno; Roberto Forloni, Barbatola/Nerviano, both of Italy

[73] Assignee: Cryovac, Inc., Duncan, S.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/653,177

[22] Filed: May 24, 1996

[51] Int. Cl.⁶ ........................................... B32B 1/08
[52] U.S. Cl. ............................. 428/36.7; 428/516
[58] Field of Search ..................... 428/516, 36.7

[56] References Cited

U.S. PATENT DOCUMENTS

| | | | |
|---|---|---|---|
| 4,640,856 | 2/1987 | Ferguson et al. | 428/36 |
| 4,746,562 | 5/1988 | Fant | 428/213 |
| 4,837,084 | 6/1989 | Warren | 428/349 |
| 5,004,647 | 4/1991 | Shah | 428/521 |
| 5,059,481 | 10/1991 | Lustig et al. | 428/39 |
| 5,165,988 | 11/1992 | Schaefer | 428/516 |
| 5,206,075 | 4/1993 | Hodgson et al. | 428/216 |
| 5,241,031 | 8/1993 | Mehta | 526/348 |
| 5,272,236 | 12/1993 | Lai et al. | 526/348 |
| 5,278,272 | 1/1994 | Lai et al. | 526/348 |
| 5,300,354 | 4/1994 | Harita | 428/516 |
| 5,318,829 | 6/1994 | Tada | 428/516 |
| 5,346,735 | 9/1994 | Logan | 428/516 |
| 5,374,459 | 12/1994 | Mumpower | 428/516 |
| 5,434,010 | 7/1995 | Smith | 428/516 |
| 5,439,717 | 8/1995 | Lustig | 428/516 |
| 5,491,011 | 2/1996 | Pezzoli | 428/516 |
| 5,543,223 | 8/1996 | Shah | 428/516 |
| 5,629,059 | 5/1997 | Desai | 428/516 |

FOREIGN PATENT DOCUMENTS

| | | |
|---|---|---|
| 0217252 | 9/1986 | European Pat. Off. . |
| 0217596 | 9/1986 | European Pat. Off. . |
| 0 236 099 | 2/1987 | European Pat. Off. . |
| A-O561 428 | 2/1987 | European Pat. Off. . |
| 0369808 | 11/1988 | European Pat. Off. . |
| 0333294 | 3/1989 | European Pat. Off. . |
| WO 93/03093 | 7/1992 | WIPO . |

*Primary Examiner*—Paul R. Michl
*Attorney, Agent, or Firm*—Mark B. Quatt

[57] ABSTRACT

A thermoplastic multilayer packaging film is described which has a % free shrink at 100°° C. lower than 30 in both directions and a % free shrink at 120° C. higher than 45 in at least one direction, and comprises at least the following layers:

(i) an oxygen barrier core layer comprising ethylene-vinyl alcohol copolymer;
(ii) two outer or skin layers and
(iii) two inner adhesive layers each adhering to opposite respective surfaces of the core layer, said film being characterized in that the outer layers (ii) essentially consist of a polymeric blend of a Component A and a Component B wherein Component A is used in a major amount and is selected from the group consisting of heterogeneous ethylene-α-olefin copolymers with a density $\leq 0.915$ g/cc, homogeneous ethylene-α-olefin copolymers with a density $\leq 0.915$ g/cc, and blends thereof, and Component B is used in a minor amount and is a polymer or a polymer blend compatible with Component A characterized by a melting point higher than 120° C.

The above film is obtained by a process which comprises the orientation of the extruded film at a temperature preferably comprised between 110° C. and 120° C.

20 Claims, No Drawings

MULTILAYER OXYGEN-BARRIER PACKAGING FILM

The present invention refers to heat-shrinkable, multilayer thermoplastic films useful in packaging. In particular the invention relates to heat-shrinkable, oxygen barrier, thermoplastic films particularly suitable for packaging of food products.

Thermoplastic films, especially polyolefin materials, have been and are still commonly used to package various articles which require protection from the environment during storage and distribution and an aesthetic and attractive appearance. Oxygen barrier characteristics are required to provide extended shelf life for the packaged product in case of food items and various materials have been used to provide lower gas permeability and thereby reduce the transmission of oxygen of the film. For example ethylene-vinyl alcohol copolymer (EVOH) has been known since many years as a good oxygen barrier material and used in conjunction with multilayer packaging films.

Good heat seal strength is an essential prerequisite for thermoplastic films particularly when used in applications where the contained product is to be kept either under vacuum or under a modified atmosphere. It is therefore advantageous to have a packaging film with improved heat seal strengths at given sealing temperatures.

A shrink feature may be imparted to a thermoplastic film by orientation, either monoaxially or biaxially, of the film during its manufacture. This shrink feature allows the film to shrink or, if restrained, create shrink tension within the film upon exposure to heat. In a typical process the thick structure which is extruded either through a round or a flat extrusion die is quickly quenched, then it is heated to a suitable temperature (the orientation temperature) and stretched in either the machine (or longitudinal) or the transverse direction or both, in varying degrees to impart a desired degree of shrinkability to the film once it is heated to a temperature close to the orientation temperature. After this stretching operation, the film is rapidly cooled to impart latent shrinkability to the resulting film. Shrinkable films provide a tight, smooth appearance to a product wrapped in such film and add some toughness that improves the package abuse resistance.

Depending on many factors which are interrelated, including the structure end use, the softening/melting point of the resins employed particularly for the outer layers and the degree of stretching desired, the orientation temperature may vary widely. Typically the orientation temperature may range from about 70–80° C. to about 130–140° C.

In the orientation of films to be converted into heat-shrinkable bags or pouches, where good shrink properties are generally needed at a temperature below the boiling temperature of water because shrinkage of the package is typically obtained by immersion into a hot water bath, and the thickness of the structure is such that not very high stretching ratios are required at the orientation step, orientation is generally carried out at a temperature of from 70 to 95° C. depending on the resins employed. Owing to the low orientation temperatures, resins with a low melting point can suitably be used in the manufacture of such structures.

When thinner structures are to be obtained, such as those to be used in the form-fill-seal machines where the product to be packaged is sometimes introduced into the formed tube at relatively high temperatures and the formed package must be able to withstand such temperatures during the packaging operations without any appreciable shrinking in order to allow the transversal seals to complete enclosure of the package, then orientation is carried out at a temperature higher than the boiling temperature of water, typically at a temperature of from about 105 to about 140° C. depending on the resins employed.

Resins with low melting temperatures are not suitable for use in the production of these structures as they will show a certain tendency to stick to parts of the production equipment such as the nip rolls in case of the trapped bubble orientation or the tenterframe clamps in case of a flat orientation. Furthermore in case of trapped bubble orientation the flattened tubing which is heated in the hot air oven to bring it to the selected orientation temperature will easily weld to itself and this will prevent opening of the bubble and orientation of the extruded structure.

The improved shrink and heat-seal properties of very low density ethylene-α-olefin copolymers (VLDPE) are now widely known.

In particular, EP-B-217,252 describes the improved properties, in terms of shrinkability and sealability, of oxygen barrier packaging films comprising at least a heat-sealing layer comprising an ethylene-α-olefin copolymer having a density $\leq 0.915$ g/cc and a given comonomer content.

From U.S. Pat. No. 4,640,856 multilayer films are known comprising, in addition to a heat sealing layer of VLDPE and an oxygen barrier layer, at least a further outer layer of VLDPE.

U.S. Pat. No. 5,059,481 describes heat-shrinkable flexible films comprising a biaxially stretched very low density polyethylene (VLDPE).

EP-A-369,808 teaches a film comprising at least a heat sealing layer of VLDPE, a core oxygen barrier layer, an outer thermoplastic layer and an intermediate layer of VLDPE interposed between the oxygen barrier layer and the outer thermoplastic layer.

Owing to the presence of at least one skin layer of VLDPE, a resin characterized by a low melting point, all these structures were obtained by processes that comprised an orientation step carried out at a temperature below the boiling temperature of water (typically comprised between about 85 and about 95° C.). As a consequence thereof the obtained structures showed a high % free shrink (typically higher than 30%) at temperatures in the above range.

EP-A-236,099 refers to a heat-shrinkable multilayer film comprising a core layer comprising ethylene-vinyl alcohol copolymer, two outer layers each comprising a polymeric material or a blend of polymeric materials and two interior layers each comprising an adhesive polymeric material. Orientation of the film to impart heat-shrinkability is carried out at a temperature preferably comprised between about 105 and about 115° C. and the outer layers preferably comprise a blend of LLDPE, LMDPE and EVA or a blend of LLDPE and VLDPE. According to EP-A-236,099, however, when a blend of LLDPE and VLDPE is employed, LLDPE is used in a major amount and VLDPE in a minor amount. In such a case preferably these outer layers comprise from about 70 to about 80% by weight of LLDPE and from about 20 to about 30% by weight of VLDPE and more preferably about 75% by weight of LLDPE and about 25% by weight of VLDPE.

Recently homogeneous ethylene-α-olefin copolymers have been introduced into the market. In contrast to the heterogeneous ethylene-α-olefin copolymers such as those referred to as linear medium density polyethylene (LMDPE), linear low density polyethylene (LLDPE), and very low density polyethylene (VLDPE), which are obtained by means of the conventional Ziegler-Natta catalysts, and are characterized by a relatively wide variety of chain lengths and comonomer percentages, the homogeneous ethylene-α-olefin copolymers are obtained by means of so-called metallocene, or single-site, or constrained geometry catalysts and are characterized by a relatively narrow molecular weight distribution and a relatively narrow composition distribution. These polymers are claimed to have very good heat sealing properties essentially due to their narrow molecular weight distribution that allows for a better control of the sealing temperature (see WO-A-9303093). The melting point of these homogeneous ethylene-α-olefin copolymers is however lower than that of the heterogeneous copolymers of the same density, so that their use in a process that involves an orientation step carried out at a temperature higher than 105° C. presents the same drawbacks seen above.

It is therefore an object of the present invention to provide a heat-shrinkable thermoplastic film that combines the benefits of the heat sealing properties of the heterogeneous VLDPE and of the homogeneous ethylene-α-olefin copolymers with the absence of any processing difficulty when it is oriented at a temperature of from about 105 to about 120° C.

It is a further object of the present invention to provide an oxygen barrier heat-shrinkable multilayer thermoplastic film endowed with good mechanical, optical and shrink properties and with improved heat sealing properties, which is obtainable by coextrusion through a round die and oriented at a temperature of from about 105° C. to about 120° C.

SUMMARY OF THE INVENTION

The above and still further objects are achieved by the present invention which provides for a thermoplastic multilayer packaging film having a % free shrink at 100° C. lower than 30 in both directions and a % free shrink at 120° C. in at least one direction higher than 45, comprising (i) an oxygen barrier core layer comprising ethylene-vinyl alcohol copolymer;

(ii) two outer or skin layers and (iii) two inner adhesive layers each adhering to opposite respective surfaces of the core layer, said film being characterized in that the outer layers (ii) essentially consist of a polymeric blend of a Component A and a Component B wherein the Component A is used in a major amount and is selected from the group consisting of heterogeneous ethylene-α-olefin copolymers with a density ≦0.915 g/cc, homogeneous ethylene-α-olefin copolymers with a density ≦0.915 g/cc, and blends thereof, and Component B, which is used in a minor amount, is a polymer or a polymer blend compatible with Component A characterized by a melting point higher than 120° C.

As used herein the term "film" refers to a flat or tubular flexible structure of thermoplastic material having a thickness up to about 50μ, preferably up to about 40μ and even more preferably from about 15 to about 35μ.

As used herein the phrase "inner layer" refers to any film layer having its two principal surfaces adhered to other layers of the multilayer film.

As used herein the phrase "adhesive layer" or "tie layer" refer to any inner layer having the primary purpose of adhering two layers to one another.

For the purposes of the present invention the term "core" and the phrase "core layer" refer to any internal film layer which has a primary function other than serving as an adhesive or compatibilizer for adhering two layers to one another. The term "oxygen barrier core layer" is intended to refer to such a core layer having the primary function of reducing the oxygen permeability of the film.

As used herein the phrase "outer layer" or "skin layer" refer to any film layer of a multilayer film having only one of its principal surfaces directly adhered to another layer of the film.

As used herein the phrase "directly adhered" as applied to film layers is defined as adhesion of the subject film layer to the object film layer, without a tie layer adhesive layer or other layer in-between. In contrast, as used herein, the word "adhered", as applied to film layers, is defined as adhesion of the subject layer to the object layer either directly or indirectly such as by use of a tie layer, an adhesive layer or other layer in-between.

As used herein, the phrase "heat-sealing" or "heat-sealant" layer, as applied to multilayer films, refers to an outer layer which is involved in the sealing of the film to itself or to another layer.

As used herein the term "oriented, heat-shrinkable" film refers to a film which has been drawn, at a temperature above the glass transition temperature (Tg) in one (monoaxially oriented) or in the two mutually perpendicular directions in the plane of the film (biaxially oriented) to induce molecular orientation therein. The orientation in the two directions may be balanced or the film may be more highly oriented in a preferred direction than in the other.

For the purposes of the present application the term "essentially consist of" clearly does not exclude the presence of additives, conventionally employed in this field, that are added to the resins in very small amounts with the aim at improving the polymer processability or the end film performance. Exemplary of such additives are for instance antioxidants, slip and antiblock agents, UV absorbers, pigments, antifog agents or compositions, antimicrobial agents, cross-linking agents, crosslinking-controlling agents, oxygen scavenging agents or compositions used to improve the film barrier properties, and the like agents. Also, said term, as used herein, does not exclude the presence of minor amounts of different resins or blends of resins coming for instance from the recycle of polymer of scrap material, as far as these minor amounts do not substantially alter the film attributes and performance.

As used herein the term "homopolymer" is used with reference to a polymer resulting from the polymerization of a single monomer, i.e. a polymer consisting essentially of a single type of repeating unit.

For the purposes of the present invention the term "copolymer" refers to a product of a polymerization reaction involving two or more different comonomers.

The term "polyolefin" refers to a thermoplastic resin obtained by polymerization of an olefin or by copolymerization of two or more olefins or of one or more olefins with other comonomers, wherein the olefin units are anyway present in larger amounts than any possibly present comonomer. Suitable examples of "polyolefins" are polyethylenes, ethylene-α-olefin copolymers either heterogeneous or homogeneous, ethylene-vinyl acetate copolymers, ethylene-acrylic acid or methacrylic acid copolymers, etc.

The term "modified polyolefin" means a polyolefin characterized by the presence of functional groups such as typically anhydride or carboxy groups. Examples of said modified polyolefins are graft copolymers of maleic acid or anhydride onto ethylene-vinyl acetate copolymers, graft copolymers of fused ring carboxylic anhydrides onto polyethylene, resin mixtures of these and mixtures with polyethylene or ethylene-α-olefin copolymers.

As used herein the phrase "heterogeneous ethylene-α-olefin copolymer" refers to polymerization reaction products of ethylene with one or more α-olefin comonomers containing from 4 to 8 carbon atoms, of relatively wide variation in molecular weight and composition distribution, i.e. polymers prepared for example, using conventional Ziegler-Natta catalysts. Such polymers typically contain a relatively wide variety of chain lengths and comonomer percentages.

As used herein the term "VLDPE" or the phrase "very low density polyethylene" refer to a heterogeneous copolymer of ethylene with one or more ($C_4$–$C_8$)-α-olefins having a density $\leq 0.915$ g/cc. Typically the density of such a VLDPE will be comprised between about 0.890 g/cc and about 0.915 g/cc, and preferably between about 0.895 g/cc and about 0.910 g/cc.

As used herein the term "LLDPE" or the phrase "linear low density polyethylene" refer to a heterogeneous copolymer of ethylene and one or more ($C_4$–$C_8$)-α-olefins having a density of from >0.915 g/cc to about 0.925 g/cc.

As used herein the term "LMDPE" or the phrase "linear medium density polyethylene" refer to a heterogeneous copolymer of ethylene and one or more ($C_4$–$C_8$)-α-olefins having a density of at least about 0.926 g/cc.

As used herein the phrase "homogeneous ethylene-α-olefin copolymers" refers to polymerization reaction products of relatively narrow molecular weight distribution and relatively narrow composition distribution. Such polymers exhibit a relatively even sequencing of comonomers within a chain, the mirroring of sequence distribution in all chains and the similarity of length of all chains, and are typically prepared using metallocene or other single site type catalysts. More particularly, homogeneous ethylene-α-olefin copolymers may be characterized by one or more methods known to those skilled in the art, such as molecular weight distribution ($M_w/M_n$), or composition distribution breadth index (CDBI). The molecular weight distribution, also known as polydispersity, may be determined by gel permeation chromatography. The homogeneous ethylene-α-olefin copolymers useful in the present invention generally have a ($M_w/M_n$) of less than about 3, preferably less than about 2.7, and even more preferably comprised between about 1.5 and about 2.5. The CDBI of such homogeneous ethylene-α-olefin copolymers will generally be greater than about 30 percent. The CDBI is defined as the weight percent of the polymer molecules having a comonomer content within 50 percent (i.e. plus or minus 50%) of the median total molar comonomer content. The CDBI of a polyethylene homopolymer, which does not contain a comonomer, is defined to be 100%. The CDBI is readily calculated from data obtained from techniques known in the art, such as for example Temperature Rising Elution Fractionation (TREF) as described for instance by Wild et al. in Journal of Polymer Science, Poly. Phys. Ed., Vol. 20, p.441 (1982). Preferably the homogeneous ethylene-α-olefin copolymers have a CDBI greater than about 50 and more preferably greater than 60%. Examples of processes suitable for preparing homogeneous ethylene-α-olefin copolymers are disclosed in U.S. Pat. No. 5,206,075, U.S. Pat. No. 5,241,031, and WO-A-9303093. Further details regarding the production of homogeneous ethylene-α-olefin copolymers are disclosed in WO-A-9003414. Another genus of homogeneous ethylene-α-olefin copolymers is disclosed in U.S. Pat. No. 5,272,236 and U.S. Pat. No. 5,278,272.

The term "EVOH" or the phrase "ethylene-vinyl alcohol copolymer" refer to saponified or hydrolyzed products of ethylene-vinyl ester copolymers, generally of ethylene-vinyl acetate copolymers, wherein the ethylene content is typically comprised between 20 and 60% by mole and the degree of saponification is generally comprised between 85 and 99.9%. The EVOH can be employed as such or blended with other EVOHs or with one or more polyamides.

The term "polyamide" as used herein refers to high molecular weight polymers having amide linkages along the molecular chain, and refers more specifically to synthetic polyamides, either aliphatic or aromatic, either in crystalline or amorphous form. Furthermore such term encompasses both polymers comprising repeating units derived from monomers such as for instance caprolactam, which polymerizes to form a polyamide, as well as copolymers of two or more different monomers bearing amino and/or carboxylic reactive groups, also referred to as copolyamides. Exemplary of such polyamides are those polymers commonly referred to as e.g. nylon 6, nylon 66, nylon 6,66, nylon 610, nylon 12, nylon 69, and nylon 6,12

As used herein the term "ethylene-vinyl acetate copolymer" or "EVA" refer to a copolymer formed from ethylene and vinyl acetate monomers wherein the ethylene derived units in the copolymers are present in major amounts, preferably between about 60 to about 98% by weight and the vinyl acetate derived units in the copolymer are present in minor amounts, preferably between about 2 and about 40% by weight.

The term "copolymer of ethylene and acrylic acid or methacrylic acid" refers to a copolymer of ethylene with a copolymerizable ethylenically unsaturated carboxylic acidic monomer selected from acrylic acid and methacrylic acid. The copolymer typically contains from about 4 to about 18% by weight of acrylic or methacrylic acid units. Said copolymer can also contain, copolymerized therein an alkyl acrylate or methacrylate, such as n-butyl acrylate or methacrylate or isobutyl acrylate or methacrylate. Said copolymer can be in the free acid form as well as in the ionized or partially ionized form wherein the neutralizing cation can be any suitable metal ion, e.g. an alkali metal ion, a zinc ion or other multivalent metal ions; in this latter case the copolymer is also termed "ionomer".

The melting points are determined by DSC analysis following ASTM D 3418. Melting information reported are second melting data, i.e. the sample is heated at a programmed rate of 10° C./min to a temperature high enough to erase previous thermal history (typically 30° C. above the approximate melting point), then it is cooled to about 50° C. below its peak crystallization temperature still at a rate of 10° C./min, and reheated (2nd melting) still at a programmed rate of 10° C./min.

The Melt Index is measured according to ASTM D-1238, Condition E, at 190° C. and is reported as grams per 10 minutes.

The % unrestrained free shrink at different temperatures, i.e. the irreversible and rapid reduction, as a percent, of the original dimensions of a sample subjected to a given temperature under conditions where nil restraint to inhibit shrinkage is present, is measured according to ASTM method D 2732, by immersing for 5 seconds specimens of the films (100 by 100-mm) into a bath of either hot water or hot oil at the given temperatures by means of a free shrink holder, removing the specimen from the bath, quickly immersing it into a water bath at room temperature, and after 5 seconds removing the specimen from the cooling bath and recording the linear dimensions of the specimens in both the longitudinal (machine) and transverse directions. The percent free shrink is defined, for each direction, as Unrestrained linear shrinkage, $\% = [(L_o - L_f)/L_o] \times 100$ wherein $L_o$ is the initial length of side and $L_f$ is the length of side after shrinking.

The shrink force which is the force released by the material during the heating/shrinking process is measured by the following internal method: Specimens of the films (2.54 cm×14.0 cm) are cut in the longitudinal and transverse direction and clamped between two jaws, one of which is connected to a load cell. The two jaws keep the specimen in the center of a channel into which an impeller blows heated air and three thermocouples measure the temperature. The signal supplied by the thermocouples is amplified and sent to an output connected to the "X" axis of a X/Y recorder. The signal supplied by the load cell is amplified and sent to an output connected to the "Y" axis of the X/Y recorder. The impeller starts blowing hot air and the force released by the sample is recorded in grams. The temperature is increased at a rate of 2° C./s.

As the temperature increases the pen draws on the X/Y recorder the measured profile of the shrink force versus the temperature thus producing a curve of the shrink force (expressed in g) versus temperature (° C.). By dividing the values thus recorded and multiplied by $10^{-3}$, by the specimen width (expressed in cm), the shrink force (in Kg/cm) is obtained.

The improved heat-sealing performance of the films according to the present invention has been evaluated by means of a simple technique of leak detection (Dopack system test) based on ASTM D 3078-84. In particular this test method evaluates the incidence of "leakers", i.e. seal defects such as pinholes which develop at or near the seal in which gases escape from or enter into the package. For each film, one hundred samples randomly taken from a production of 250 packs on a Delta 2000 SB HFFS machine were tested by immersing groups of four packs in a plastic cylinder filled with water, closing the container, drawing the vacuum and setting the vacuum valve at 0.3 bar, letting the trapped air escape from the outside of the packs and then detecting the leakers by observing the bubbles that escape from the seals. The number of leakers then gives the "leaker rate". For a better evaluation of the heat-sealing performance of the films according to the invention, different sealing bar configurations and different settings have been employed: naked wires with sealing temperature set at 140° C. and sealing pressure of 2.0 and 3.0 bar, and Teflon™ covered wires with sealing temperature set at 180° C. and sealing pressure of 3.5 bar. These so-called "drastic conditions" i.e. conditions out of the ideal sealing window, were applied in order to better discriminate the sealing behavior of the tested structures.

DETAILED DESCRIPTION OF THE PRESENT INVENTION

A first object of the present invention is a thermoplastic multilayer packaging film having a % free shrink at 100° C. lower than 30 in both directions and a % free shrink at 120° C. higher than 45 in at least one direction, comprising (i) an oxygen barrier core layer comprising ethylene-vinyl alcohol copolymer;

(ii) two outer or skin layers and (iii) two inner adhesive layers each adhering to opposite respective surfaces of the core layer, said film being characterized in that the outer layers (ii) essentially consist of a polymeric blend of a Component A and a Component B wherein the Component A is used in a major amount and is selected from the group consisting of heterogeneous ethylene-α-olefin copolymers with a density $\leq 0.915$ g/cc, homogeneous ethylene-α-olefin copolymers with a density $\leq 0.915$ g/cc, and blends thereof, and Component B is used in a minor amount and is a polymer or a polymer blend compatible with Component A characterized by a melting point higher than 120° C.

The barrier layer of the present film is most preferably a blend of an ethylene-vinyl alcohol copolymer and a copolyamide. Ethylene-vinyl alcohol copolymers having an ethylene content between about 28 and about 49% by mole are preferred. Exemplary of such is EVAL EC F151A or EVAL EC F101A from Marubeni. A preferred copolyamide is a nylon 6,12, which is a copolymer of caprolactam and laurolactam, such as Grilon CF 6S or Grilon W 8361 from EMS. Generally the EVOH comprises a major portion of the barrier blend and is most preferably about 90% by weight of the blend with the copolyamide comprising about 10% of the blend, although the EVOH may comprise from about 70 to about 100% of the barrier blend and the copolyamide may comprise from about 0 to about 30% of the blend.

The adhesive layers (iii) generally comprise a modified polyolefin possibly blended with a polyolefin. Preferred adhesives are those having blends of a linear low density polyethylene or an ethylene-vinyl acetate copolymer grafted with at least one unsaturated, aromatic or fused ring carboxylic acid anhydride, and one or more resins such as linear low density polyethylene, although other adhesives such as low density polyethylene based adhesives can also be used. Exemplary of suitable adhesives are for instance Bynel CXA 4104, or Bynel CXA 4105 from DuPont, Plexar 169 from Quantum, Admer AT1072E, Admer AT1073E, Admer SF 700E, Admer SE800, or Admer NF520E from Mitsui, or blends thereof.

In a preferred embodiment of the present invention the adhesive layers (iii) directly adhere the core layer (i) and the outer layers (ii) and the film is therefore a five layer film. Alternatively, other inner layers may be interposed between the core layer (i) and the adhesive layers (iii) and/or between the adhesive layers (iii) and the outer layers (ii). Preferably however the end structure will contain an odd number of layers and will be symmetrical, wherein for the purposes of the present invention symmetry is not affected by the presence of different additives or of the same additives in different amounts.

The outer layers essentially consist of a blend of Component A and Component B wherein this latter is employed in an amount of from about 5 to less than about 50% by weight, preferably in an amount of from about 10 to about 40% by weight, and even more preferably in an amount of from about 15 to about 35% by weight, and the balance is essentially Component A.

The preferred ratio by weight between Component B and Component A in the blend will depend on the respective melting points, wherein the lower the melting point of Component A the higher is the amount of Component B which should suitably be employed.

Component A is selected from the group consisting of heterogeneous ethylene-α-olefin copolymers having a density $\leq 0.915$ g/cc, homogeneous ethylene-α-olefin copolymers having a density $\leq 0.915$ g/cc, and blends thereof. Suitable co-monomers are selected from butene-1,4-methyl-pentene-1, hexene-1, and octene-1, and preferably from butene-1, hexene-1, and octene-1. Typically the density of both the heterogeneous and the homogeneous ethylene-α-olefin copolymers will be comprised between about 0.890 and about 0.915 g/cc. When using a heterogeneous ethylene-α-olefin copolymer a preferred density will be comprised between about 0.895 and about 0.910 g/cc, while when using a homogeneous ethylene-α-olefin copolymer a preferred density range is from about 0.900 to about 0.912 g/cc.

The MFI of these copolymers may vary widely, e.g. from about 0.2 g/10' to about 10 g/10'. Preferred values are however comprised between about 0.5 and about 5.0 g/10'. The use of copolymers with low MFI in fact increases the mechanical strength of the overall structure but worsens the processability of the polymer.

Preferably Component B is a polymer or polymer blend compatible with Component A and is characterized by a melting point $\geq 123°$ C. and even more preferably $\geq 125°$ C.

Polymers which can suitably be employed as Component B, either alone or in the form of a blend, include heterogeneous ethylene-α-olefin copolymers with a density >0.915 g/cc, such as LLDPE or LMDPE, and ethylene homopolymers.

Preferably however said Component B will comprise an LMDPE with a density of from about 0.926 g/cc to about 0.940 g/cc, such as Dowlex 2237E from Dow. Alternatively a preferred Component B will comprise an LLDPE, such as Dowlex 3010E from Dow.

Accordingly, a preferred embodiment of the present invention is a thermoplastic multilayer packaging film having a % free shrink at 100° C. lower than 30 in both directions and a % free shrink at 120° C. higher than 45 in at least one direction, comprising
  (i) an oxygen barrier core layer comprising ethylene-vinyl alcohol copolymer;
  (ii) two outer or skin layers and
  (iii) two inner adhesive layers each adhering to opposite respective surfaces of the core layer,
said film being characterized in that the outer layers (ii) essentially consist of a polymeric blend of a Component A and a Component B wherein Component A is used in a major amount and is selected from the group consisting of heterogeneous ethylene-α-olefin copolymers with a density of from about 0.890 and about 0.915 g/cc, homogeneous ethylene-α-olefin copolymers with a density of from about 0.890 and about 0.915 g/cc, and their blends, and Component B is used in an amount of from about 5% by weight to less than about 50% by weight, based on the overall weight of the blend, and is a polymer or a polymer blend compatible with Component A characterized by a melting point higher than 120° C.

A more preferred embodiment of the present invention is a thermoplastic multilayer packaging film having a % free shrink at 100° C. lower than 30 in both directions and a % free shrink at 120° C. higher than 45 in at least one direction, comprising
  (i) an oxygen barrier core layer comprising ethylene-vinyl alcohol copolymer;
  (ii) two outer or skin layers and
  (iii) two inner adhesive layers each adhering to opposite respective surfaces of the core layer,
said film being characterized in that the outer layers (ii) essentially consist of a polymeric blend of a Component A and a Component B wherein Component A is used in a major amount and is selected from the group consisting of heterogeneous ethylene-α-olefin copolymers with a density of from about 0.895 to about 0.910 g/cc, homogeneous ethylene-α-olefin copolymers with a density of from about 0.900 to about 0.912 g/cc, and blends thereof, and Component B is used in an amount of from about 5% by weight to less than about 50% by weight, based on the overall weight of the blend and is a polymer selected from the group consisting of LLDPE, LMDPE, ethylene homopolymers and blends thereof, characterized by a melting point $\geq 123°$ C.

An even more preferred embodiment of the present invention is a thermoplastic multilayer packaging film having a % free shrink at 100° C. lower than 30 in both directions and a % free shrink at 120° C. higher than 45 in at least one direction, comprising
  (i) an oxygen barrier core layer comprising ethylene-vinyl alcohol copolymer;
  (ii) two outer or skin layers and
  (iii) two inner adhesive layers each adhering to opposite respective surfaces of the core layer,
said film being characterized in that the outer layers (ii) essentially consist of a polymeric blend of a Component A and a Component B wherein Component A is used in a major amount and is selected from the group consisting of heterogeneous ethylene-α-olefin copolymers with a density of from about 0.895 to about 0.910 g/cc, homogeneous ethylene-α-olefin copolymers with a density of from about 0.900 to about 0.912 g/cc, and blends thereof, and Component B is used in an amount of from about 10% by weight to about 40% by weight, based on the overall weight of the blend, and is a polymer selected from the group consisting of LLDPE, LMDPE, ethylene homopolymers and blends thereof, characterized by a melting point $\geq 125°$ C.

A most preferred embodiment of the present invention is a thermoplastic multilayer packaging film having a % free shrink at 100° C. lower than 30 in both directions and a % free shrink at 120° C. higher than 45 in at least one direction, comprising
  (i) an oxygen barrier core layer comprising ethylene-vinyl alcohol copolymer;
  (ii) two outer or skin layers and
  (iii) two inner adhesive layers each directly adhering to opposite respective surfaces of the core layer and to the outer layers (ii),
said film being characterized in that the outer layers (ii) essentially consist of a polymeric blend of a Component A and a Component B wherein Component A is used in a major amount and is selected from the group consisting of heterogeneous ethylene-α-olefin copolymers with a density of from about 0.895 to about 0.910 g/cc, homogeneous ethylene-α-olefin copolymers with a density of from about 0.900 to about 0.912 g/cc, and blends thereof, and Component B is used in an amount of from about 15% by weight to about 35% by weight, based on the overall weight of the blend, and is a polymer selected from the group consisting of LLDPE, LMDPE and blends thereof, characterized by a melting point $\geq 125°$ C.

The film according to the present invention may be prepared by a process which involves the co-extrusion of a thick tubular shape laminate film (called "tape") which is quenched just under the die, folded by a pair of nip rolls and then heated to a temperature typically comprised between about 105 and about 120° C., and preferably of at least 110° C., and expanded, still at this temperature, by internal air pressure to get the transversal orientation and by a differential speed of the pinch rolls which hold the bubble to provide the longitudinal orientation so as to get a cylindrically-shaped laminate thin film. After being so stretched the film is rapidly cooled to somehow freeze-in the resulting film a latent shrinkability ("trapped bubble" technique).

Alternatively the films according to the present invention can also be prepared by extrusion coating wherein the multilayer tube to be oriented is formed by extruding or co-extruding a first tape (called the primary tape) and then coating said tape with the other layers which are either sequentially extruded or in a single step coextruded thereon.

Still alternatively the film according to the present invention may be prepared by flat co-extrusion or extrusion coating followed, after a quenching step, by the orientation of the extruded film by tenterframe at a temperature generally comprised between about 105° C. and about 120° C.

In a preferred embodiment of the present invention the film is cross-linked and this is generally achieved by submitting the film to an energetic radiation treatment, typically by high energy electron treatment. In such a case irradiation is most preferably performed prior to orientation. Radiation dosages are referred to herein in terms of the radiation units "Grays", with one thousand Grays being designated as "KGrays". A suitable radiation dosage of high energy may be in the range of up to about 120 KGrays, more preferably from about 20 to about 90 KGrays.

In line of principle however if the whole film has to be irradiated, the irradiation step can be carried out also after orientation. If only some of the layers of the films need to be irradiated, the irradiation step will be carried out on the primary tape.

When the whole film is cross-linked by electron-beam irradiation, it may be advantageous to make use of cross-linking controlling agents which can be added to the different layers in different amounts to control the degree of crosslinking in each layer. Suitable crosslinking controlling agents are for instance those described in EP-A-333,294 and in the prior art documents cited therein. In such a case the crosslinking controlling agent will be preferably added to the outer layer (ii) which will be used in the end film as the heat-sealing layer to further improve the heat sealing characteristics of the film.

Alternatively, chemical cross-linking of the resins can be achieved by the addition of suitable cross-linking agents, e.g. peroxides, to the resins to be cross-linked or a combination of chemical cross-linking and irradiation can be used where the cross-linking agents added to the resins need some irradiation to trigger the cross-linking reaction.

The present heat-shrinkable film may optionally be subjected to other types of energetic radiation treatments which may have different aims. As an example the film may be subjected to a corona discharge treatment to improve the bonding and print receptivity characteristics of the film surface.

Sometimes it may be desirable to selectively reduce the shrink force of the thus obtained film, at least in the transverse direction, without appreciably reducing the free shrink. This can be useful for instance when the film is used as a tray wrapping or a tray lidding, since films having a shrink force in the transverse direction higher than 0.05 kg/cm may cause distortion of the most commonly used trays. In such a case the desired reduction in shrink force may be achieved by subjecting the film thus obtained to a heat treatment under strictly controlled conditions. In particular such a heat treatment involves heating the film to a temperature of from 70 to 100° C. for a time of from 0.1 to 7.5 seconds and then cooling it down to a temperature below room temperature, preferably below 20° C., in less than 5 seconds. When a cross-linked film is desired, such a heat-treatment may be carried out either before or after cross-linking, otherwise it may be carried out, after orientation, on the film before it is wound up.

Films in accordance with the present invention are preferably coextruded through a round die and oriented biaxially by the trapped bubble technique at a temperature of about 110–120° C., even more preferably at a temperature of from about 113–118° C. Such films preferably have an orientation ratio of 3.0 to 4.0 in the longitudinal or machine direction as well as in the transverse direction.

Another object of the present invention is therefore a process for preparing a thermoplastic multilayer packaging film having a % free shrink at 100° C. lower than 30 in both directions and a % free shrink at 120° C. higher than 45 in at least one direction, comprising (i) an oxygen barrier core layer comprising ethylene-vinyl alcohol copolymer;

(ii) two outer or skin layers and (iii) two inner adhesive layers each adhering to opposite respective surfaces of the core layer, said film being characterized in that the outer layers (ii) essentially consist of a polymeric blend of a Component A and a Component B wherein Component A is used in a major amount and is selected from the group consisting of heterogeneous ethylene-α-olefin copolymers with a density $\leq 0.915$ g/cc, homogeneous ethylene-α-olefin copolymers with a density $\leq 0.915$ g/cc, and blends thereof, and Component B is used in a minor amount and is a polymer or a polymer blend compatible with Component A characterized by a melting point higher than 120° C., which process comprises coextruding the film through a round die, quenching the tape just under the die, reheating it at a temperature of from about 110 to about 120° C., preferably from about 113 to about 118° C., and then orienting it in at least one direction; said process further comprising optional known energetic and heat treatments to improve the film properties.

A further object of the present invention are the heat-shrinkable films endowed with improved heat sealing properties obtainable by the above process.

The films according to the present invention share remarkable heat sealing properties. In particular, when compared to the presently available gas-barrier films, such as for instance those described in EP-A-217,596, the films according to the present invention afford a much better package hermeticity.

The following Examples are representative of the preferred embodiments of the heat-shrinkable films according to the present invention.

Unless otherwise indicated the percentages reported herein are by weight.

EXAMPLES 1 to 4

Four symmetrical five layer structures were extruded, irradiated at about 60 KGrays and biaxially oriented out of hot air at about 116° C. The resultant 25µ thick films had a layer ratio of 2/2/1/2/2 and the following general structure A+B/C/D/C/A+B wherein D is a blend of 90% of an ethylene-vinyl alcohol copolymer (EVAL EC F151A from Marubeni) and 10% of a nylon 6,12 (Grilon CF S6 from EMS), C is a modified polyolefin (an anhydride grafted polyolefin in an ethylene-butene copolymer sold by DuPont under the trade name Bynel CXA 4104) and A+B is a blend of about 72.2% by weight Component A, about 24.3% Component B, about 3% antifog agents and about 0.5% antiblock agents, wherein Component B is an LMDPE with density of about 0.935 g/cc and m.p. 128° C. (Dowlex 2237E from Dow) and Component A is as indicated in Table I below:

TABLE I

| Example no. | A |
|---|---|
| 1 | heterogeneous ethylene-octene copolymer with density of about 0.902 g/cc and MFI of about 3.0 g/10' (Teamex 1000F from DSM) |
| 2 | homogeneous ethylene-octene copolymer with density of about 0.907 g/cc and MFI of about 1.1 g/10' (Affinity |

TABLE I-continued

| Example no. | A |
|---|---|
| | PL1840 from Dow) |
| 3 | homogeneous ethylene-octene copolymer with density of about 0.902 g/cc and MFI of about 1.2 g/10' (Affinity PL1880 from Dow) |
| 4 | heterogeneous ethylene-octene copolymer with density of about 0.910 g/cc and MFI of about 2.0 g/10' (Stamylex 08–026 from DSM) |

EXAMPLE 5

A symmetrical five layer film having the general structure: A+B/C'/D/C'/A+B wherein the layer ratio was 2/2/1/2/2, A,B, and D were as described in Example 1 and C was a blend of two Admer adhesives from Mitsui, was extruded, irradiated and biaxially oriented out of hot air at about 118° C. to provide a 25$\mu$ thick film.

Comparative Examples 6 and 7

Two symmetrical five layer structures differing from those of Examples 2 and 3 respectively for the absence of Component B in the outer layers (ii), were coextruded and irradiated but could not be oriented. In fact, after passing through the hot air oven, the tape was completely welded and even with the use of huge amounts of antisticking agents it could not be opened. The tape could be opened only by decreasing the hot air oven temperature by about 20° C., down to 95–97° C. At these low orientation temperatures however no bubble blowing was possible.

Comparative Example 8

For comparative purposes a symmetrical five layer structure according to the teaching of EP-A-217,596 was extruded, irradiated and oriented out of hot air at 116° C. as described above. The resultant 25$\mu$ thick film had the structure E/C/D/C/E, with a layer ratio of 2/2/1/2/2 wherein C and D were as defined above and E was a ternary blend of 50% of a heterogeneous ethylene-octene copolymer with density of about 0.918 g/cc (Dowlex 2045 from Dow), 25% of a heterogeneous ethylene-octene copolymer with density of about 0.935 g/cc (Dowlex 2237E from Dow) and 25% of an ethylene-vinyl acetate copolymer with a vinyl acetate content of about 4% (Escorene LD 362 BW from Exxon), containing small amounts of antifog and slip agents.

EXAMPLES 9 and 10

Symmetrical five layer 25$\mu$ thick films having the general structure A'+B'/C/D/C/A'+B' wherein the layer ratio is 2/2/1/2/2, C and D are as described in Examples 1 to 4 above and A'+B' is a blend of a heterogeneous ethyleneoctene copolymer with density of about 0.912 g/cc and MFI of about 1.0 g/10' (Attane 4201 from Dow) and of an LMDPE with density of about 0.935 g/cc and m.p. 128° C. (Dowlex 2237E from Dow) in a ratio of 9/1 (Ex. 9) and 9.5/0.5 (Ex.10) containing small amounts of antifog and slip agents, are obtained by following substantially the same procedure described in preceding Examples 1 to 5.

EXAMPLE 11

A symmetrical seven-layer 25$\mu$ thick film having the general structure: A+B/C/F/D/F/C/A+B with a layer ratio of 3/1/1/1/1/1/3 wherein A,B,C,and D are as defined in Example 1 and F is a nylon 6,66 (Ultramid C35 from BASF) is obtained by following substantially the procedure described in Examples 1 to 4.

EXAMPLE 12

A symmetrical five-layer 25$\mu$ thick film having the general structure A+B"/C/D/C/A+B" wherein the layer ratio, A,C, and D are as defined in Example 1 and B" is an LLDPE with density of about 0.921 g/cc and m.p. of 125° C. (Dowlex 3010E from Dow) is prepared by following substantially the same procedure described in Examples 1 to 4.

EXAMPLE 13

A symmetrical five layer 19$\mu$ thick film having the same structure as in Example 1 with a layer ratio of 2/1/1/1/2 is prepared by following substantially the same procedure as in Examples 1 to 4.

EXAMPLE 14

The symmetrical five-layer film of Example 1 is submitted to a heat treatment that is carried out on a processing unit consisting of the sequence of 6 stainless steel Gross Equatherm heated rollers and two cooled rollers, 16-cm in diameter and 203-cm in length, disposed in such a way that the contact time of the film web with each roller is 0.26 s and the total heating time is 1.56 s.

The temperature (° C.) in the three heating zones (each comprising two rollers) and that in the cooling zone is reported below:

| 1st zone | 2nd zone | 3rd zone | 4th zone |
|---|---|---|---|
| 90 | 90 | 70 | 12 |

The revolving speed of the rollers is the same as the line speed. With respect to the starting film which has a maximum transversal shrink tension at a temperature of from room temperature to 140° C. much higher than 0.05 kg/cm, the maximum transversal shrink tension of the film thus obtained is drastically reduced to less than 0.05 kg/cm, while the % free shrink remains almost unaffected.

EXAMPLE 15

A symmetrical five-layer film is prepared by following the same procedure as in Example 1 with the only difference that the composition of the A+B blend of the outer layer (ii) which will become the heat-sealing layer also comprises about 3.5% by weight of a hydrogenated petroleum hydrocarbon resin (Arkon P-90 by Arakawa Chemical Co.) as a cross-linking controlling agent.

Several physical properties of the films of Examples 1 to 4 were evaluated and are given in Table II below. The film of Comparative Example 8 is representative of the prior art and is given for comparative purposes.

TABLE II

| | Film of Example no. | | | | |
|---|---|---|---|---|---|
| | 1 | 2 | 3 | 4 | Comp. Ex 8 |
| Modulus[1] at 23° C. | | | | | |
| L (kg/cm$^2$) | 6146 | 5657 | 5608 | 6405 | 6196 |
| T (kg/cm$^2$) | 6432 | 5787 | 5504 | 6665 | 6215 |
| Tensile strength[2] | | | | | |

TABLE II-continued

| | Film of Example no. | | | | |
|---|---|---|---|---|---|
| | 1 | 2 | 3 | 4 | Comp. Ex 8 |
| L (kg/cm²) | 925 | 870 | 869 | 1000 | 1024 |
| T (kg/cm²) | 851 | 762 | 711 | 938 | 850 |
| Elongation³ % | | | | | |
| L | 90 | 94 | 91 | 97 | 100 |
| T | 86 | 100 | 100 | 94 | 101 |
| Shrink % at 100° C. | | | | | |
| L | 13 | 14 | 12 | 13 | 13 |
| T | 25 | 25 | 26 | 24 | 26 |
| Shrink % at 120° C. | | | | | |
| L | 57 | 59 | 59 | 57 | 59 |
| T | 58 | 59 | 58 | 58 | 60 |
| Haze⁴ % | 5.7 | 6.1 | 6.5 | 6.7 | 5.6 |
| Gloss⁵ (i = 60°) | 112 | 112 | 110 | 110 | 115 |

[1] the ratio of the change in force to the change in elongation in the straight line portion of an Instron Tensile Testing curve - measured by ASTM D 882-Method A
[2] a measure of the force required under constant elongation to break a specimen of the film - measured by ASTM D 882
[3] a measure of the percent extension required to break a specimen of the film - measured by ASTM D 882
[4] the percentage of transmitted ligth which is scattered forward while passing through a specimen of the film - measured by ASTM D 1003 - Method A
[5] the surface reflectance or shine of a specimen - measured by ASTM D 2457

To evaluate the improved sealing behavior of the films according to the present invention, the films of Examples 1 to 4 were also submitted to the "leaker rate" test in comparison with the prior art film of Comparative Example 8. The results are reported in Table III below.

TABLE III

Leaker rate at different settings and bars configurations - same speed:55 ppm

| | Naked wires 200 ms Impulse Time | | Teflon ™ covered wires 50 ms Impulse Time |
|---|---|---|---|
| Pressure (bar) | 2 | 3 | 3.5 |
| Temperature (°C.) | 140 | 140 | 180 |
| Example 1 | 20 | 0 | 17 |
| Example 2 | 26 | 4 | 12 |
| Example 3 | 38 | — | — |
| Example 4 | 21 | 30 | — |
| Comparative Example 8 | 66 | 38 | 69 |

What is claimed is:

1. A thermoplastic multilayer packaging film comprising:
   a) a core layer comprising ethylene/vinyl alcohol copolymer in which the ethylene comprises between 20 mole % and 60 mole %, of the ethylene/vinyl alcohol copolymer;
   b) two outer layers, each layer consisting essentially of a blend of
      i) 50% or more of a first polymeric component selected from the group consisting of heterogeneous ethylene/alpha-olefin copolymer with a density of less than or equal to 0.915 g/cc, and homogeneous ethylene/alpha-olefin copolymer with a density of less than or equal to 0.915 g/cc; and
      ii) from about 5% to less than about 50% of a second polymeric component comprising a heterogeneous ethylene/alpha-olefin copolymer having a melting point of greater than 120° C., and a density of greater than 0.915 g/cc; and
   c) two intermediate adhesive layers each disposed between the core layer and a respective outer layer, said adhesive layers selected from the group consisting of
      i) a blend of linear low density polyethylene grafted with at least one unsaturated, aromatic, or fused ring carboxylic acid anhydride, and linear low density polyethylene,
      ii) a blend of ethylene/vinyl acetate grafted with at least one unsaturated, aromatic, or fused ring carboxylic acid anhydride, and linear low density polyethylene, and
      iii) low density polyethylene based adhesive;
   wherein the film has a free shrink at 100° C. of less than 30% in each of the machine and transverse directions, and a free shrink at 120° C. of greater than 45% in at least one of the machine and transverse directions.

2. The film of claim 1 wherein the first polymeric component has a density of between 0.890 and 0.915 g/cc.

3. The film of claim 2 wherein the first polymeric component has a density of between 0.895 and 0.910 g/cc.

4. The film of claim 2 wherein the first polymeric component has a density of between 0.900 and 0.912 g/cc.

5. The film of claim 1 wherein the second polymeric component comprises between 5 and 50% by weight of the blend of each outer layer.

6. The film of claim 5 wherein the second polymeric component comprises between 10 and 40% by weight of the blend of each outer layer.

7. The film of claim 5 wherein the second polymeric component comprises between 15 and 35% by weight of the blend of each outer layer.

8. The film of claim 1 wherein the second polymeric component has a melting point of at least 123° C.

9. The film of claim 8 wherein the second polymeric component has a melting point of at least 125° C.

10. The film of claim 1 wherein the second polymeric component is selected from the group consisting of linear low density polyethylene, linear medium density polyethylene, and ethylene homopolymer.

11. The film of claim 1 wherein the two intermediate adhesive layers each directly adhere the core layer to a respective outer layer.

12. The film of claim 1 wherein the film has a free shrink at 120° C. of greater than 45% in each of the machine and transverse directions.

13. A method of making a film comprising:
   a) extruding the film through a die, the film comprising
      i) a core layer comprising ethylene/vinyl alcohol copolymer in which the ethylene comprises between 20 mole % and 60 mole %, of the ethylene/vinyl alcohol copolymer;
      ii) two outer layers, each layer consisting essentially of a blend of
         50% or more of a first polymeric component selected from the group consisting of heterogeneous ethylene/alpha-olefin copolymer with a density of less than or equal to 0.915 g/cc, and homogeneous ethylene/alpha-olefin copolymer with a density of less than or equal to 0.915 g/cc; and
         from about 5% to less than about 50% of a second polymeric component comprising a heterogeneous ethylene/alpha-olefin copolymer having a melting point of greater than 120° C., and a density of greater than 0.915 g/cc; and
      iii) two intermediate adhesive layers each disposed between the core layer and a respective outer layer, said adhesive layers selected from the group consisting of i) a blend of linear low density polyethylene grafted with at least one unsaturated, aromatic, or fused ring carboxylic acid anhydride, and linear low density polyethylene, ii) a blend of ethylene/vinyl acetate grafted with at least one unsaturated, aromatic, or fused ring carboxylic acid anhydride, and linear low density polyethylene, and iii) low density polyethylene based adhesive;

b) quenching the extruded film;

c) reheating the quenched film to a temperature of between 110 and 120° C.; and d) orienting the reheated film in at least one of the machine and transverse directions, such that the film has a free shrink at 100° C. of less than 30% in each of the machine and transverse directions, and a free shrink at 120° C. of greater than 45% in at least one of the machine and transverse directions.

14. The method of claim 13 wherein the film is coextruded through a die.

15. The method of claim 14 wherein the film is coextruded through an annular die.

16. The method of claim 13 wherein the extruded film is quenched soon after exiting the die.

17. The method of claim 13 wherein the quenched film is reheated to a temperature of between 113 and 118° C.

18. The method of claim 13 wherein the quenched film is irradiated.

19. The method of claim 13 wherein the oriented film is heat treated after orientation.

20. A package comprising:

a) a food article; and b) a film wrapped around at least a portion of the food article, the film comprising i) a core layer comprising ethylene vinyl alcohol copolymer in which the ethylene comprises between 20 mole % and 60 mole %, of the ethylene/vinyl alcohol copolymer;

ii) two outer layers, each layer consisting essentially of a blend of

50% or more of a first polymeric component selected from the group consisting of heterogeneous ethylene/alpha-olefin copolymer with a density of less than or equal to 0.915 g/cc, and homogeneous ethylene/alpha-olefin copolymer with a density of less than or equal to 0.915 g/cc; and from about 5% to less than about 50% of a second polymeric component comprising a heterogeneous ethylene/alpha-olefin copolymer having a melting point of greater than 120° C., and a density of greater than 0.915 g/cc; and iii) two intermediate adhesive layers each disposed between the core layer and a respective outer layer, said adhesive layers selected from the group consisting of i) a blend of linear low density polyethylene grafted with at least one unsaturated, aromatic, or fused ring carboxylic acid anhydride, and linear low density polyethylene, ii) a blend of ethylene/vinyl acetate grafted with at least one unsaturated, aromatic, or fused ring carboxylic acid anhydride, and linear low density polyethylene, and iii) low density polyethylene based adhesive;

wherein the film has a free shrink at 100° C. of less than 30% in each of the machine and transverse directions, and a free shrink at 120° C. of greater than 45% in at least one of the machine and transverse directions.

* * * * *